US012698877B2

(12) United States Patent
Paugam et al.

(10) Patent No.: US 12,698,877 B2
(45) Date of Patent: Aug. 4, 2026

(54) REMOVABLE LIGHTING ASSEMBLY

(71) Applicant: VALEO VISION, Bobigny (FR)

(72) Inventors: Stephane Paugam, Bobigny (FR); Olivier Ruat, Bobigny (FR); Gavin Warner, Bobigny (FR); Stephane Patrizi, Bobigny (FR); Matthieu Syre, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/859,338

(22) PCT Filed: Apr. 28, 2023

(86) PCT No.: PCT/EP2023/061277
§ 371 (c)(1),
(2) Date: Oct. 23, 2024

(87) PCT Pub. No.: WO2023/209168
PCT Pub. Date: Nov. 2, 2023

(65) Prior Publication Data
US 2025/0264197 A1 Aug. 21, 2025

(30) Foreign Application Priority Data

Apr. 29, 2022 (FR) ..................................... 2204100
Dec. 9, 2022 (FR) ..................................... 2213076

(51) Int. Cl.
*F21S 41/19* (2018.01)
*B60Q 1/04* (2006.01)
(Continued)

(52) U.S. Cl.
CPC ................ *F21S 41/24* (2018.01); *B60Q 1/04* (2013.01); *B60Q 1/0466* (2013.01); *F21S 41/26* (2018.01);
(Continued)

(58) Field of Classification Search
CPC .......... B60Q 1/04; B60Q 1/0466; F21S 41/19
See application file for complete search history.

(56) References Cited

U.S. PATENT DOCUMENTS 6,652,129 B2 11/2003 Aoki
6,821,006 B2 11/2004 Shikiya
(Continued)

FOREIGN PATENT DOCUMENTS

DE 102018005317 A1 1/2020
DE 102019218671 A1 6/2021
(Continued)

OTHER PUBLICATIONS

European Patent Office, International Search Report (with English translation) and Written Opinion of corresponding International Application No. PCT/EP2023/061277, dated Aug. 8, 2023.
(Continued)

*Primary Examiner* — Sean P Gramling
(74) *Attorney, Agent, or Firm* — Valeo Vision

(57) ABSTRACT

The invention relates to a light assembly including a main housing with a front opening and a rear opening facing at least a part of the front opening, a luminous device with a secondary housing, and an outer lens sealingly closing the front opening of the main housing. The luminous device can be seated in the rear opening, and the secondary housing is sealingly and reversibly fastened to the main housing. In the event of a failure of a component of a luminous device of a light assembly and/or in the event of impacts damaging a part of the light assembly, the light assembly according to the invention requires just one part to be replaced, for example, only the outer lens and the main housing or only the luminous device need be replaced.

6 Claims, 3 Drawing Sheets

(51) Int. Cl.

| | |
|---|---|
| *F21S 41/24* | (2018.01) |
| *F21S 41/26* | (2018.01) |
| *F21S 43/20* | (2018.01) |
| *F21S 43/237* | (2018.01) |
| *F21S 45/50* | (2018.01) |

(52) U.S. Cl.
CPC ....... *F21S 43/237* (2018.01); *F21S 43/26231* (2024.05); *F21S 45/50* (2018.01)

(56) References Cited

U.S. PATENT DOCUMENTS

| | | | |
|---|---|---|---|
| 7,416,321 B2 | 8/2008 | Formanek et al. | |
| 10,195,981 B1 | 2/2019 | Wu | |
| 2003/0012033 A1* | 1/2003 | Shikiya ................... | F21S 43/50 362/543 |
| 2020/0256536 A1* | 8/2020 | Kizaki ................. | B60Q 1/0052 |

FOREIGN PATENT DOCUMENTS

| | | | |
|---|---|---|---|
| FR | 3121085 | A1 | 9/2022 |
| GB | 2451125 | A | 1/2009 |
| JP | H1064329 | A | 3/1998 |
| JP | 2002324418 | A | 11/2002 |
| JP | 2010225377 | A | 10/2010 |
| JP | 2018190548 | A | 11/2018 |
| WO | 2021168406 | A1 | 8/2021 |

OTHER PUBLICATIONS

Japan Patent Office, Office Action (with English translation) of corresponding Japanese Patent Application No. 2024-563726, dated Aug. 22, 2025, 8 pages.
Japan Patent Office, Search Report (with English translation) of corresponding Japanese Patent Application No. 2024-563726, dated Aug. 29, 2025, 27 pages.
Japan Patent Office, Office Action (with English Translation) of corresponding Japanese Patent Application No. 2024-563726, dated Feb. 2, 2026, 11 pages.

* cited by examiner

REMOVABLE LIGHTING ASSEMBLY

TECHNICAL FIELD

The technical field of the invention is the field of light assemblies for automotive vehicles (private vehicles or commercial vehicles). The light assembly may in particular be capable of emitting a lighting and/or signaling function.

The present invention relates in particular to removable light assemblies, in particular those located at the front or at the rear of the vehicle.

BACKGROUND OF THE INVENTION

At present, automotive vehicles are equipped with light assemblies at the front and rear, either to illuminate the road or to be visible to other motorists. These assemblies consist of one or more light sources arranged in a hermetically sealed housing, since usage conditions require the assembly to be sealed to prevent water from reaching the light sources. As a result, in the event of an accident damaging a part of the assembly or of failure, for example affecting one of the light sources or an electronic component, the entire assembly has to be changed, which increases the cost of repair for the user.

SUMMARY OF THE INVENTION

The invention offers a solution to the problems mentioned above, by requiring only the part of the assembly which is damaged to be changed, and not the complete assembly.

The invention relates to a light assembly intended to be mounted on an automotive vehicle and comprising:
- a main housing comprising a first side with a front opening and a second side, opposite the first side, with a rear opening facing at least a part of the front opening,
- a luminous device with a secondary housing,
- an outer lens sealingly closing the front opening in the first side of the main housing,
- it is characterized in that the luminous device is seated in the rear opening in the second side of the main housing, and the secondary housing is sealingly and reversibly fastened to the second side of the main housing. The front opening preferably extends over the entire front surface of the main housing.

In the event of a failure of a component of a luminous device of a light assembly and/or in the event of impacts damaging a part of the light assembly, the light assembly according to the invention requires just one part of the light assembly to be replaced: for example, only the outer lens and the main housing or only the luminous device need be replaced, while guaranteeing the seal of the assembly before and after the repair. This helps to reduce repair costs.

The opening in the second side, opposite the first side, enables the luminous device to be inserted into to the main housing, in particular if the latter is closed irreversibly on the first side by the outer lens.

The invention also permits a degree of standardization since the same main housing with the related outer lens of a given light assembly can be used with different luminous devices depending on the equipment level of the vehicle.

Advantageously, the outer lens is irreversibly fastened to the main housing. The outer lens may, for example, be bonded to the main housing.

Advantageously, the secondary housing comprises a groove in which a gasket is positioned facing the main housing. This gasket guarantees the seal between the two housings, in particular between the secondary housing of the luminous device and the main housing of the light assembly.

Advantageously, the luminous device comprises means for attaching the secondary housing to the main housing. This fastening means for example consists of lugs placed on the secondary housing, in which fastening screws may be inserted into complementary fastening means, such as screw bushings, placed on the main housing. Tightening the fastening screws compresses the gasket on the main housing, thereby guaranteeing the sealed fastening of the secondary housing, and therefore of the luminous device, on the main housing.

Advantageously, the secondary housing is open on a front face and the outer lens closes the front face of the secondary housing. Indeed, since the secondary housing is sealingly fastened to the main housing and the outer lens sealingly closes the front opening of the main housing, the outer lens forms part of the sealed closure of the front face of the secondary housing. In particular, the front face of the secondary housing is not fastened to the outer lens, i.e. the front face of the secondary housing and the outer lens are not in contact. The outer lens then participates indirectly in closing the front face of the secondary housing.

Advantageously, the luminous device comprises a light source and an optical deviation element, such as for example a reflector, a lens or a light guide. The optical deviation element is used to shape the light rays emitted by the light source to participate in the formation of a light or signaling beam.

According to a first embodiment, the luminous device is a headlamp or a taillight. In particular, the headlamp, or respectively the taillight, may comprise one or more luminous modules, or respectively one or more lighting units. The luminous module or modules, or respectively the lighting unit or units, are arranged in the secondary housing. According to one example, the secondary housing comprises a cavity receiving the luminous module or modules, or respectively the lighting unit or units. The cavity may in particular comprise an opening, and the headlamp, or respectively the taillight, may or may not have a closing outer lens closing the opening of this cavity.

For example, each luminous module, or respectively each lighting unit, comprises at least one light source and an optical deviation element for shaping the light rays emitted by the light source.

Advantageously, the main housing has an elongate shape having two ends and comprises two headlamps or two taillights, each having a secondary housing sealingly and reversibly fastened to each end of the main housing. In this case, the light assembly is intended to cover the entire front or rear width of the vehicle. The main housing and the outer lens then constitute a panel to which the headlamps or taillights are attached. In this case, the light assembly comprises both this panel, which is very voluminous and very wide with the outer lens, which is large and therefore expensive, as well as several other very expensive elements, such as headlamps or taillights. The invention obviates the need to change the whole of the light assembly, formed by the panel and the headlamps or the taillights, in the event of a headlamp or a taillight failing, or in the event of an impact on the outer lens. Indeed, only the defective headlamp or taillight needs to be changed, enabling the pane to be kept, i.e. the outer lens and the main housing as well as the other headlamp or taillight, or only the outer lens and the main housing need to be changed, enabling the headlamps or taillights to be kept.

Advantageously, the outer lens covers both beadlamps or both taillights. In particular, the secondary housing of each of the two headlamps or each of the two taillights is open on a front face, and the outer lens covers the front face of the secondary housings of both headlamps or of both taillights. This opening in the front face may correspond to the opening of the cavity of the secondary housing. The panel in this case comprises a single large outer lens covering both headlamps or both taillights and the part located therebetween, instead of two smaller outer lenses each covering only a single headlamp or a single taillight. The light assembly according to the invention is in this case particularly advantageous because the headlamps or the taillights can be saved in the event of impacts on the outer lens, for example.

Advantageously, the light assembly includes at least one light guide placed in the main housing behind the outer lens. These light guides are used to form a light pattern. These light guides are used in particular to form a light signature specific to the automotive vehicle on which the light assembly is intended to be mounted.

Advantageously, the or each light guide is fed by a light source arranged in the headlamp or in the taillight. This obviates the need for electronics in the panel. In other words, in the light assembly, only the headlamps or the taillights include electronic components. This makes it easy to separately replace the panel, or one or other of the headlamps or taillights.

This specific light source may be arranged in the secondary housing of the headlamp or taillight, for example on a dedicated printed circuit board. "Dedicated printed circuit board" means that this printed circuit board differs from a printed circuit board on which the light source of the headlamp or taillight is arranged and which produces the light or signaling beam.

According to a second embodiment, the light assembly is a headlamp and the luminous device comprises at least one luminous module.

The invention and its various applications will be better understood from reading the following description and from examining the accompanying figures.

BRIEF DESCRIPTION OF THE DRAWINGS

The figures show a non-limiting example of the invention.

DETAILED DESCRIPTION OF THE INVENTION

Unless stated otherwise, the same element appearing in different figures is provided with a single reference.

Throughout the description, the side through which the light exits will be called "front", and the side from which the light is emitted will be called "rear".

Figure 1:
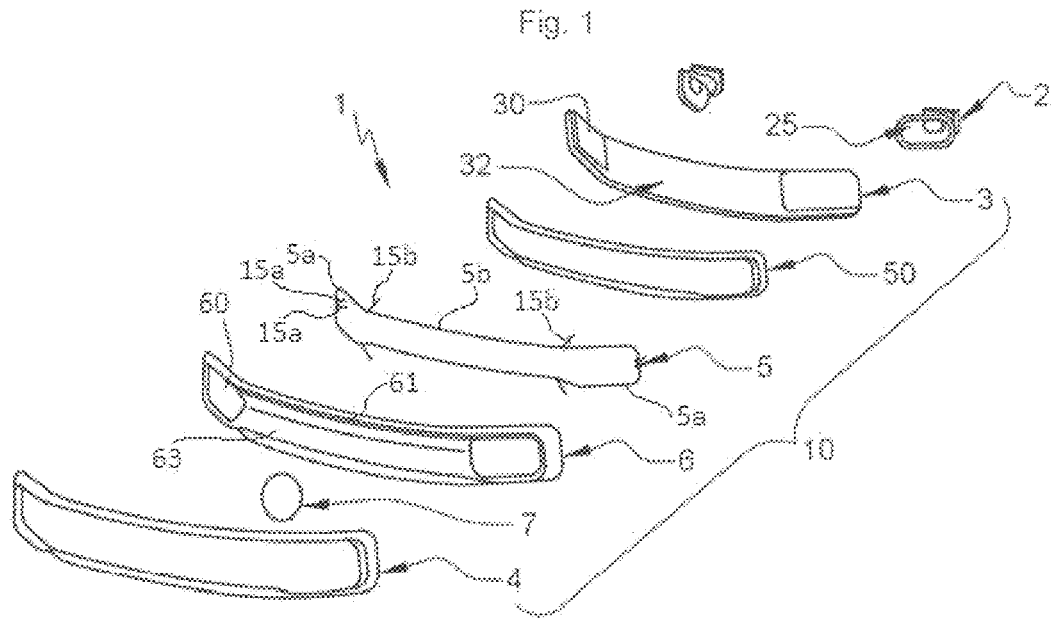
FIG. 1 is an exploded view of a first embodiment of the invention.

In the first embodiment illustrated in FIG. 1, the light assembly 1 comprises two luminous devices formed by two headlamps 2, a main housing 3 and an outer lens 4. The description is given here for luminous devices formed by front headlamps, but this would apply in the same way to luminous devices formed by taillights. The main housing 3 comprises a first side with a front opening 32 and a second side, opposite the first side, with two rear openings 30. In an alternative that is not shown, the light assembly may comprise only one headlamp, and the main housing may comprise only one rear opening.

In the example illustrated, the main housing 3 has an elongate shape having two ends. The front opening 32 extends from one end of the main housing 3 to the other, i.e. over the entire surface of the main housing 3. Each of the rear openings 30 faces the front opening 32, at one of the ends of the main housing 3.

The outer lens 4 faces the front opening 32 of the main housing 3. It sealingly closes the front opening of the main housing 3. In the example illustrated, the outer lens 4 is fastened to the main housing 3 by bonding. As visible in FIG. 2, which shows a cross section made in the middle of the assembled light assembly 1, the outer lens 4 comprises a rib 40, and the main housing 3 comprises a slot 31 receiving the rib 40. To rigidly connect the outer lens 4 to the main housing 3 by bonding, adhesive is inserted into the slot 31, and the rib 40 of the outer lens 4 is then inserted into the slot 31. Alternatively, the outer lens 4 could be joined to the main housing 3 by welding, or by a hotplate process. It is understood that the outer lens 4 is therefore fastened not only sealingly to the main housing 3, but also irreversibly, or in other words in a non-removable manner. The outer lens 4 and the main housing 3 thus form a non-removable panel 10. "Non-removable" means that the outer lens 4 cannot be detached from the main housing 3 without damaging the outer lens 4 and/or the main housing 3.

The headlamps 2 are each arranged at one end of the main housing 3, facing one of the rear openings 30 of the main housing 3, and they are attached to the main housing 3. Each headlamp 2 comprises a front opening 25 aligned with the rear opening 30 of the main housing 3.

When the light assembly 1 is mounted on a vehicle, the panel 10 covers the entire front of the vehicle, and both headlamps 2, arranged at each end of the main housing 3, thus constitute a right-hand headlamp and a left-hand headlamp of the vehicle.

The headlamps 2 have at least one light source and one optical deviation element, such as for example a reflector, a lens or a light guide, for shaping the light rays emitted by the light source to form at least part of a light or signaling beam. For example, the headlamps 2 may comprise luminous modules including the at least one light source and the optical deviation element.

Since the outer lens 4 also faces the rear openings 30 of the main housing 3, the light or signaling beam formed by each headlamp 2 can thus pass through the outer lens 4 and be visible from outside the light assembly 1.

Figure 3:
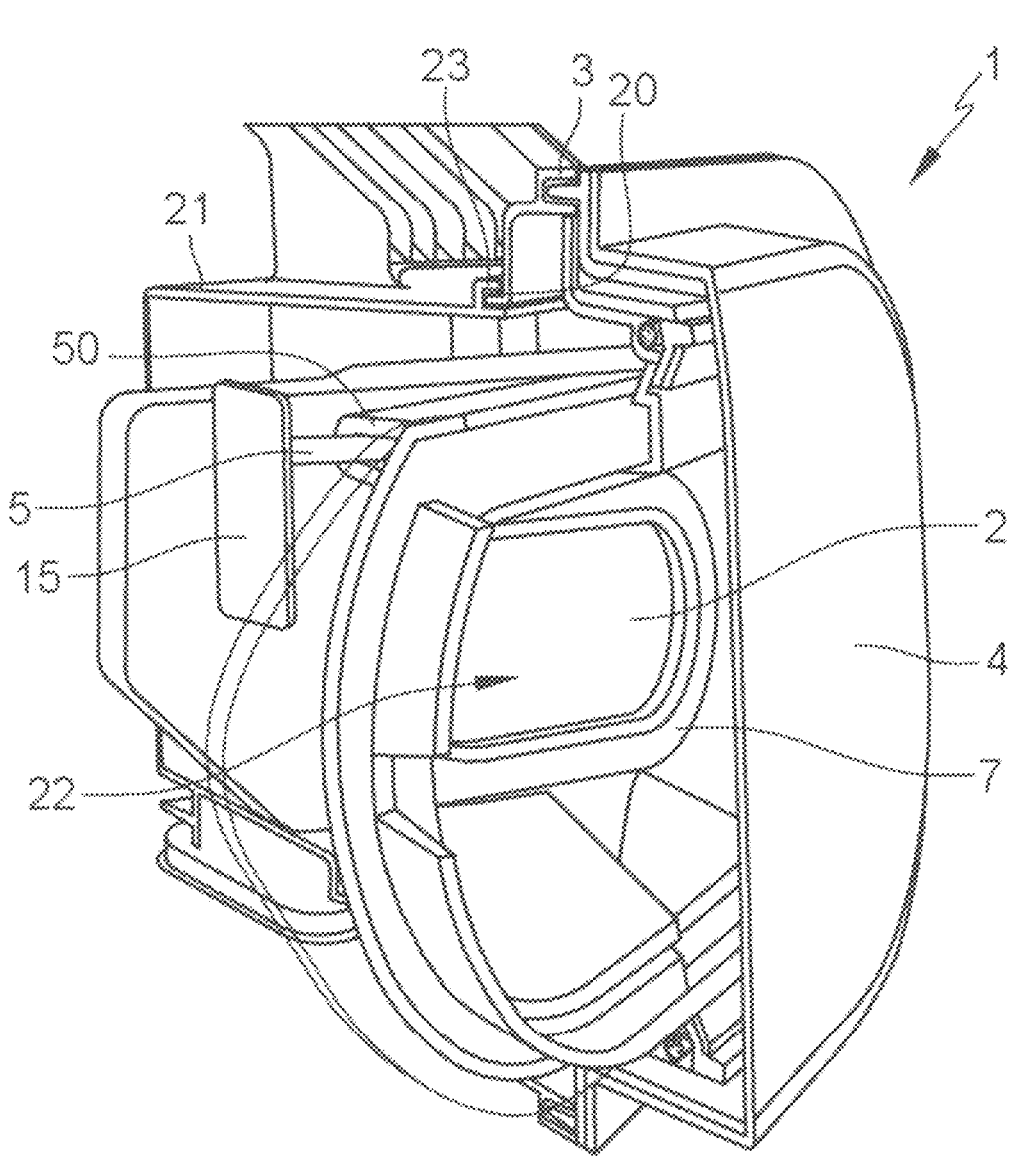
FIG. 3 shows a detail of a cross-sectional view of the assembly in FIG. 1.

FIG. 3 shows a cross section of the light assembly 1 at one of the headlamps 2. Each headlamp 2 comprises a secondary housing 21 sealingly and reversibly attached to the main housing 3.

The secondary housing 21 comprises attachment elements which cooperate with complementary attachment elements arranged on the main housing 3. For example, the attachment elements of the secondary housing 21 may be formed by lugs arranged on the periphery of the secondary housing 21 and including a through-hole, and the complementary attachment elements arranged on the main housing 3 may be formed by screw bushings. Thus, fastening screws can be inserted into the through-holes and into the screw bushings in order to attach the secondary housing 21 and the main housing 3 together in a reversible manner. The headlamps 2 can thus be removed from the main housing 3 and therefore from the panel 10.

The light assembly 1 comprises a gasket 20 positioned in a groove 23 of the secondary housing 21 and bearing against the main housing 3 in order to guarantee a sealed fastening between the headlamp 2 and the panel 10. When the secondary housing 21 is joined to the main housing 3, the fastening screws are tightened, which brings the main housing 3 into contact with the secondary housing 21, thus compressing the gasket 20 between the main housing 3 and the secondary housing 2. This guarantees the seal between the main housing 3 and the secondary housing 2.

In this example, the headlamps 2 do not have their own closing outer lens. In other words, the front opening 25 of each headlamp is not closed by a outer lens specific to the headlamp. The outer lens 4 indirectly and sealingly closes the front opening 25 of each headlamp 2, thereby protecting the headlamps 2. In fact, the outer lens 4 sealingly closes the front opening 32 of the main housing 3, and the secondary housing 21 of each headlamp 2 is sealingly fastened to the main housing 3 at the rear openings 30. Thus, the outer lens 4 sealingly closes the front openings 25 of the headlamps 2.

In a variant that is not shown, the front opening 25 of the headlamps 2 can be sealingly closed by an outer lens specific to the headlamp 2.

In the non-limiting example illustrated, the light assembly 1 also comprises a plurality of light guides 5, a support 50 for the light guides 5, and a mask 6. The support 50 for the light guides 5, the light guides 5 and the mask 6 are arranged between the main housing 3 and the outer lens 4, and more precisely between the first side of the main housing 3 and the outer lens 4. The support 50 for the light guides 5, the light guides 5 and the mask 6 are sandwiched between the main housing 3 and the outer lens 4. The panel 10 thus comprises the light guides 5, the support 50 for the light guides 5 and the mask 6.

The support 50 for the light guides, the light guides 5 and the mask 6 are optional. The panel 10 need only comprise the main housing 3 and the outer lens 4. It is also possible for the panel 10 to comprise only the main housing 3, the outer lens 4 and one or other of the mask 6 and the assembly formed by the support 50 for the light guides 5 and the light guides 5.

The light guides 5 are used to form a light signature specific to the vehicle on which the light assembly 1 is mounted. In the example illustrated, the light assembly comprises six light guides 5 distributed along the periphery of the front face of the main housing 3. Two curved lateral light guides 5a are located at each end of the main housing 3, and two central light guides 5b join the lateral light guides 5a in pairs. This distribution of the light guides 5 optimizes the guiding of the light in the curved parts. However, the number of light guides is not limiting, and a single light guide, or two light guides, could for example be used.

Figure 2:
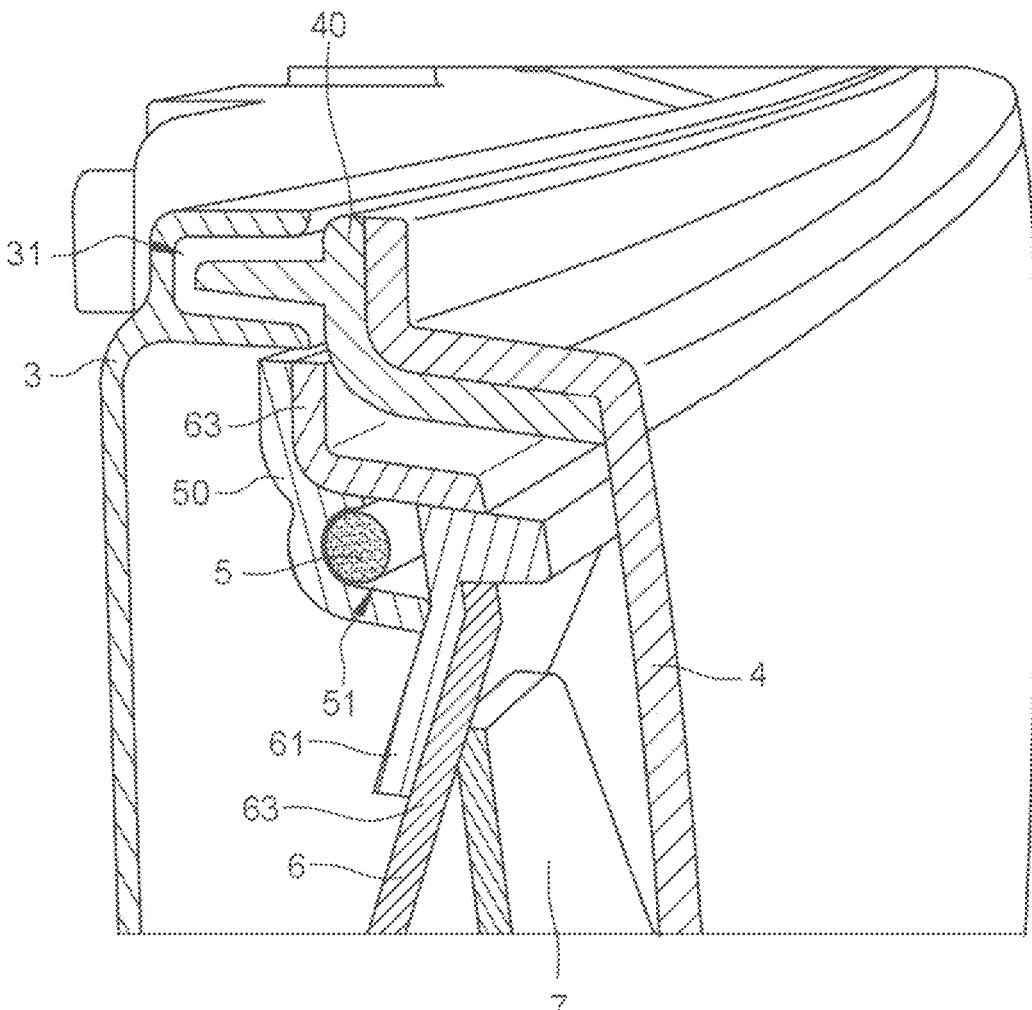
FIG. 2 is a cross-sectional view of the middle of the assembly in FIG. 1.

As visible in FIG. 2, the light guides 5 are placed in a groove 51 of the support 50 for the light guides 5, to be held in position.

Each light guide 5 is fed by at least one light source arranged in one of the headlamps 2. The light sources feeding the light guides 5 are positioned in the secondary housing 21 of the headlamps 2, for example on a dedicated printed circuit board 15 (visible in FIG. 3). Thus, the panel 10 does not have any electronic components, which enables the panel or one or other of the headlamps 2 to be replaced more easily and separately. It will be noted that the light sources feeding the light guides 5 are distinct from the light sources forming the light or signaling beams of the headlamps 2.

The central light guides 5b are each fed by a light source arranged in one of the headlamps 2 at the first end thereof, and a light source arranged in the other of the headlamps 2 at the second end thereof. FIG. 1 shows the two light inlets 15b of the central light guides 5b. This double feed to the central light guides 5b enables the central light guides 5b to be uniformly illuminated. The lateral light guides 5a are fed by a single light source arranged in the headlamp 2 located at the same end of the main housing 3 as the corresponding lateral light guide 5a. FIG. 1 shows the light inlet 15a of the lateral light guides 5a.

The mask 6 is arranged in front of the support 50 for the light guides 5 and the light guides 5. The mask 6 comprises two orifices 60 placed at the ends thereof and facing the rear openings 30 of the main housing 3. The orifices 60 therefore also face the headlamps 2, and in particular face the front openings 25 of the headlamps 2. The light or signaling beams emitted by the headlamps 2 can thus be transmitted through the rear openings 30, the front opening 32 and the orifices 60 as far as the outer lens 4, so that they are visible from outside the light assembly 1.

The mask 6 comprises an opaque part 63 enabling certain parts of the light assembly 1 to be masked, in particular the central part of the light assembly 1, and a transparent part 61 facing the light guides 5, in front of the light guides 5. The light guides 5 and the light emitted by the light guides 5 can thus be seen from outside the light assembly 1.

Moreover, patterns may be drawn on the front face of the mask 6, corresponding to the face turned toward the outer lens 4, to style the vehicle. For example, the patterns may be geometric shapes.

The support 50 for the light guide 5 and the mask 6 are for example joined together by snap-fitting or screwing, and the light guides 5 are positioned and held by being sandwiched between the support 50 and the mask 6. Alternatively, the support 50 and the mask 6 could be joined together by bonding. Joining by snap-fitting or screwing reduces joining time compared to joining by bonding, which requires a drying time.

Once assembled, the support 50, the light guides 5 and the mask 6 are positioned between the main housing 3 and the outer lens 4, being sandwiched between the main housing 3 and the outer lens 4. Thus, the panel 10 comprising the main housing 3, the support 50, the light guides 5, the mask 6 and the outer lens 4 is joined in a non-removable manner.

The panel may optionally also comprise a logo 7 arranged between the mask 6 and the outer lens 4.

The light assembly 1 is advantageous in that in the event of an impact on the outer lens 4 or in the event of malfunction of one of the headlamps 2, only the panel 10 needs to be changed, enabling the headlamps 2 to be kept, or only one of the headlamps 2 needs to be changed, enabling the panel 10 and the other headlamp 2 to be kept.

To change the panel 10, all that is required is to remove the light assembly 1, then to unscrew the two headlamps 2 from the panel 10, and to screw the two headlamps 2 back onto a new panel. To change one of the headlamps, all that is required is to remove the light assembly 1, then to unscrew the headlamp 2 to be changed and to replace this defective headlamp 2 with another headlamp.

In this embodiment, the panel 10 can be more or less complex depending on the options (with or without light guide, with or without logo, etc.), and the removable joining of the headlamps 2 to the panel 10 enables different, more or less sophisticated, headlamps 2 to be mounted on the panel 10, depending on the desired performance of the light assembly 1.

Figure 4:
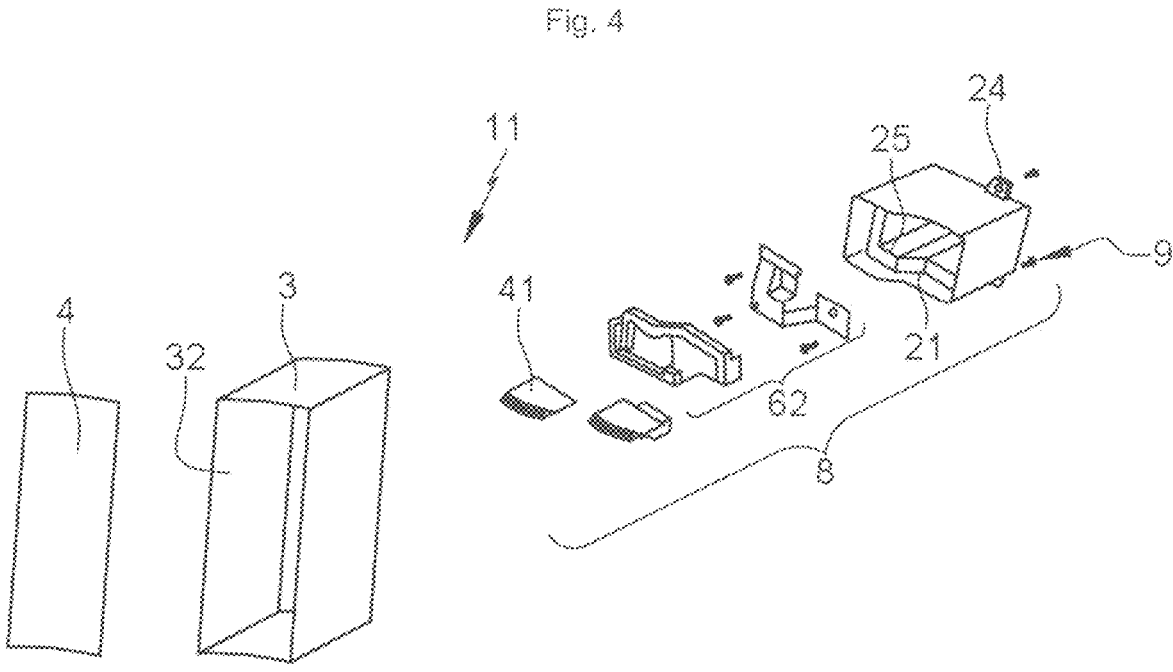
FIG. 4 is an exploded view of a second embodiment at one of the headlamps.

FIG. 4 shows a second embodiment in which the light assembly 1 is a headlamp 11 and comprises a main housing 3, an outer lens 4 and a luminous device 8. The luminous device 8 comprises luminous modules 41, a support 62 for the luminous modules 41, and a secondary housing 21 in which the luminous modules 41 and the support 62 for the luminous modules 41 are arranged.

Elements similar to the first embodiment will be described briefly, it being understood that the description given of these elements in the first embodiment applies.

As in the first embodiment, the main housing 3 comprises a first side with a front opening 32 and a second side, opposite the first side, with a rear opening (not visible) facing the front opening 32, and the outer lens 4 sealingly closes the front opening in the first side of the main housing 3. Furthermore, the outer lens 4 is irreversibly fastened to the main housing 3. The fastening of the outer lens 4 to the main housing 3 is similar to that described for the first embodiment.

The rear opening is intended to receive the secondary housing 21 of the luminous device 8. As in the first embodiment, the secondary housing 21 of the luminous device 8 comprises lugs 24 having through-holes distributed on the periphery of the secondary housing 21, co-operating with screw bushings of the main housing 3 and enabling the insertion of fastening screws 9 to reversibly attach the secondary housing 21 to the main housing 3. Furthermore, the secondary housing 21 of the luminous device 8 is also mounted sealingly on the main housing 3. As described for the first embodiment, a gasket may be used to guarantee the seal.

The luminous device 8 comprises a front opening 25 aligned with the rear opening of the main housing 3. In the example illustrated, the luminous device 8 does not have its own closing outer lens. In other words, the front opening 25 of the luminous device 8 is not closed by an outer lens specific to the luminous device 8. The outer lens 4 of the headlamp 11 enables the front opening 25 of the luminous device 8 to be closed indirectly and sealingly.

The luminous modules 41 have at least one light source and one optical deviation element, such as for example a reflector, a lens or a light guide, for shaping the light rays emitted by the light source to form at least part of a light or signaling beam. The beams emitted by the luminous modules 41 pass through the outer lens 4 and are thus visible from outside the headlamp 11.

With this headlamp 11 according to the invention, in the event of an impact on the outer lens 4, only the assembly formed by the outer lens 4 and the main housing 3 needs to be changed, enabling the luminous device 8 to be kept. And, in the event of malfunction of a luminous module 41, only the luminous device 8 needs to be changed, enabling the assembly formed by the outer lens 4 and the main housing 3 to be kept.

Moreover, the removable joining of the luminous device 8 to the main housing of the headlamp 11 makes it possible to change the luminous device 8 mounted on the headlamp 11, and in particular the number or type of luminous modules arranged in the luminous device 8.

Figure 5:
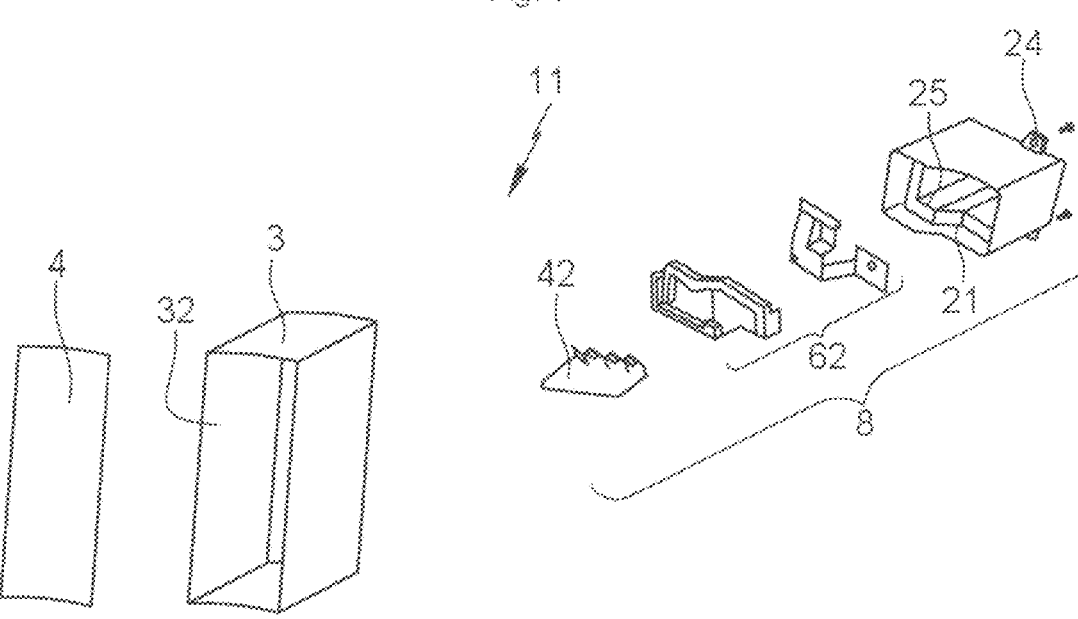
FIG. 5 is an exploded view of a variant of the second embodiment.

Thus, as shown in FIG. 5 showing a variant of the second embodiment, the luminous device 8 may comprise just one luminous module 42 instead of the two luminous modules 41. Furthermore, the luminous module 42 is different from the luminous module 41. Thus, the headlamp 11 can easily be adapted depending on the lighting or signaling functions to be performed by the headlamp 11 by choosing the luminous device 8 which is positioned in the headlamp 11. The headlamp 11 therefore enables good interchangeability between different luminous devices 8.

What is claimed is:

1. A light assembly intended to be mounted on an automotive vehicle and to cover a front or rear width of the vehicle, comprising:
   a main housing including a first side with a front opening and a second side, opposite the first side, with a rear opening facing at least a part of the front opening, and having an elongated shape having two ends,
   two headlights or two rear lights, each having a secondary housing,
   an outer lens sealingly closing the front opening in the first side of the main housing and covering the two headlights or two rear lights,
and the two headlights or two rear lights are seated in the rear opening in the second side of the main housing, and the secondary housings are sealingly and reversibly fastened to the second side of each end of the main housing, with at least one light guide in the main housing behind the outer lens, the light guide being powered by a light source arranged in at least one of the headlights or the rear lights, and positioned in the secondary housing of the at least one headlight or the at least one rear light, on a dedicated printed circuit board that is distinct from a printed circuit board on which a light source of the headlight or rear light is arranged.

2. The light assembly as claimed in claim 1, wherein the outer lens is irreversibly fastened to the main housing.

3. The light assembly as claimed in claim 1, wherein the secondary housing includes a groove in which a gasket is positioned facing the main housing.

4. The light assembly as claimed in claim 1, wherein the two headlights or the two rear lights include means for attaching the secondary housing to the main housing.

5. The light assembly as claimed in claim 1, wherein the secondary housing is open on a front face and in that the outer lens closes the front face of the secondary housing.

6. The light assembly as claimed in claim 1, wherein the two headlights or the two rear lights include a light source and an optical deviation element.

* * * * *